(12) United States Patent
Ishihara et al.

(10) Patent No.: US 11,393,177 B2
(45) Date of Patent: Jul. 19, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Yasuko Ishihara, Tokyo (JP); Hidenori Aoki, Chiba (JP); Shintaro Tsutsui, Tokyo (JP); Fujio Arai, Tokyo (JP); Naoyuki Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/253,928

(22) PCT Filed: Jun. 25, 2019

(86) PCT No.: PCT/JP2019/025253
§ 371 (c)(1),
(2) Date: Dec. 18, 2020

(87) PCT Pub. No.: WO2020/012955
PCT Pub. Date: Jan. 16, 2020

(65) Prior Publication Data
US 2021/0264677 A1    Aug. 26, 2021

(30) Foreign Application Priority Data
Jul. 9, 2018 (JP) .............................. JP2018-129746

(51) Int. Cl.
*G06T 19/00* (2011.01)
*G06F 3/01* (2006.01)
*G06T 19/20* (2011.01)

(52) U.S. Cl.
CPC ............ *G06T 19/006* (2013.01); *G06F 3/011* (2013.01); *G06T 19/20* (2013.01); *G06T 2219/004* (2013.01); *G06T 2219/2004* (2013.01)

(58) Field of Classification Search
CPC . G06T 19/006; G06T 19/20; G06T 2219/004; G06T 2219/2004; G06F 3/011
See application file for complete search history.

(56) References Cited

U.S. PATENT DOCUMENTS 10,192,115 B1 * 1/2019 Sheffield ............... G06T 19/006

FOREIGN PATENT DOCUMENTS

JP    2007-064684 A    3/2007
JP    2008-275340 A    11/2008
(Continued)

OTHER PUBLICATIONS

Suzuki et al., Prototype of a Cooking Support System Overlaying Cooking Instructions over Ingredients, IEICE Technical Report, Sep. 27, 2012, pp. 89-94.

*Primary Examiner* — Chong Wu
(74) *Attorney, Agent, or Firm* — Paratus Law Group, PLLC (57) ABSTRACT

An information processing apparatus includes a controller (100) that performs: control of displaying information in augmented reality in a preparation mode in which a real object is disposed, the information that supports disposition of the real object on the basis of prerecorded information about the real object with which a virtual object has an interaction; and control of recording disposition result information of the real object in a disposition result information database referred to in a normal mode in which the virtual object that has the interaction with the disposed real object is displayed.

19 Claims, 7 Drawing Sheets

(56) References Cited

FOREIGN PATENT DOCUMENTS

| | | |
|---|---|---|
| JP | 2015-095147 A | 5/2015 |
| JP | 2015-219590 A | 12/2015 |

\* cited by examiner

| CATEGORY | EXAMPLE |
|---|---|
| ID OF VIRTUAL OBJECT | INTERACTION_AREAXX_01 |
| GENERAL NAME | DESK, GARBAGE CAN, BOX, CHAIR, FLOWER VASE |
| DISPOSITION INFORMATION | (x,y,z) = (100,200,180) |
| 3D ASSET | DESIGNATE ASSET FILE (3D MODEL) DISPLAYED IN PREPARATION MODE |
| SIZE INFORMATION | 30cm × 50cm × 1m<br>※DESIGNATION OF RADIUS IS POSSIBLE |
| MATERIAL | ALUMINUM, GLASS, SOFT |
| WEIGHT | 2 KG OR MORE |
| CONTENTS OF INTERACTION WITH VIRTUAL OBJECT | HIDE, BUMP AND COMPLAIN OF PAIN, APPEAR, PRODUCE SOUND WHEN BUMPED |
| REFERENCE IMAGE OF REAL OBJECT | image |
| ALTERNATIVE PROCESSING IN CASE WHERE THIS REAL OBJECT HAS NOT BEEN DISPOSED | ・NOT DISPLAY VIRTUAL OBJECT, NOT PRODUCE SOUND<br>・DISPLAY REAL OBJECT AS VIRTUAL OBJECT<br>・DISPLAY VIRTUAL OBJECT EVEN IF THERE IS NO REAL OBJECT<br>・NOT START APPLICATION (INDISPENSABLE-FOR-DISPOSITION REAL OBJECT) |
| COMMENT | EXAMPLE)<br>PLEASE SET IT NOT TO FALL JUST AT A TOUCH BECAUSE IT'S A SCENE IN WHICH A USER COMES NEAR A VIRTUAL OBJECT |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/025253 (filed on Jun. 25, 2019) under 35 U.S.C. § 371, which claims priority to Japanese Patent Application No. 2018-129746 (filed on Jul. 9, 2018), which are all hereby incorporated by reference in their entirety.

TECHNICAL FIELD

The present disclosure relates to an information processing apparatus, an information processing method, and a program.

BACKGROUND ART

In recent years, there is a technique to provide a user with information by superimposing and displaying a virtual object on a real object.

For example, PTL 1 described below discloses a technique to recognize an object (a real object) in a moving image captured from an ever-changing point of view and maintain a state in which associated information of the object is displayed.

CITATION LIST

Patent Literature

PTL 1: Japanese Unexamined Patent Application Publication No. 2015-95147

SUMMARY OF THE INVENTION

In a case where an imaginary object is superimposed and displayed on a real object, it is possible to produce an interaction between the real object and the virtual object (for example, such as that the virtual object collides with the real object and a sound is produced, or that the virtual object sits on the real object); however, to provide such user experience, it is desirable to dispose a designated real object in a designated place in advance. If a virtual object performs a predetermined interaction despite the fact that a designated real object has not been disposed in a designated place, the interaction looks like an unnatural action, which causes a feeling of strangeness.

Accordingly, the present disclosure proposes an information processing apparatus, an information processing method, and a program that make it possible to support disposition of a real object related to a virtual object and prevent deterioration of user experience in a case where the virtual object is displayed.

According to the present disclosure, there is proposed an information processing apparatus including a controller that performs: control of displaying information in augmented reality in a preparation mode in which a real object is disposed, the information that supports disposition of the real object on the basis of prerecorded information about the real object with which a virtual object has an interaction; and control of recording disposition result information of the real object in a disposition result information database referred to in a normal mode in which the virtual object that has the interaction with the disposed real object is displayed.

According to the present disclosure, there is proposed an information processing method that is performed by a processor, the information processing method including: displaying information in augmented reality in a preparation mode in which a real object is disposed, the information that supports disposition of the real object on the basis of prerecorded information about the real object with which a virtual object has an interaction; and recording disposition result information of the real object in a disposition result information database referred to in a normal mode in which the virtual object that has the interaction with the disposed real object is displayed.

According to the present disclosure, there is proposed a program causing a computer to function as a controller that performs: control of displaying information in augmented reality in a preparation mode in which a real object is disposed, the information that supports disposition of the real object on the basis of prerecorded information about the real object with which a virtual object has an interaction; and control of recording disposition result information of the real object in a disposition result information database referred to in a normal mode in which the virtual object that has the interaction with the disposed real object is displayed.

As described above, according to the present disclosure, it is possible to support disposition of a real object related to a virtual object and prevent deterioration of user experience in a case where the virtual object is displayed.

It is to be noted that above-described effects are not necessarily limitative; in addition to or in place of the above effects, there may be achieved any of the effects described in the present specification or other effects that may be grasped from the present specification.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

Furthermore, description is given in the following order.
1. Overview of Information Processing System According to Embodiment of Present Disclosure
2. Configuration of Information Processing Apparatus
3. Operation Processing
   3-1. Operation Processing in Preparation Mode
   3-2. Operation Processing in Normal Mode
4. Conclusion Summary

1. OVERVIEW OF INFORMATION PROCESSING SYSTEM ACCORDING TO EMBODIMENT OF PRESENT DISCLOSURE

Figure 1:
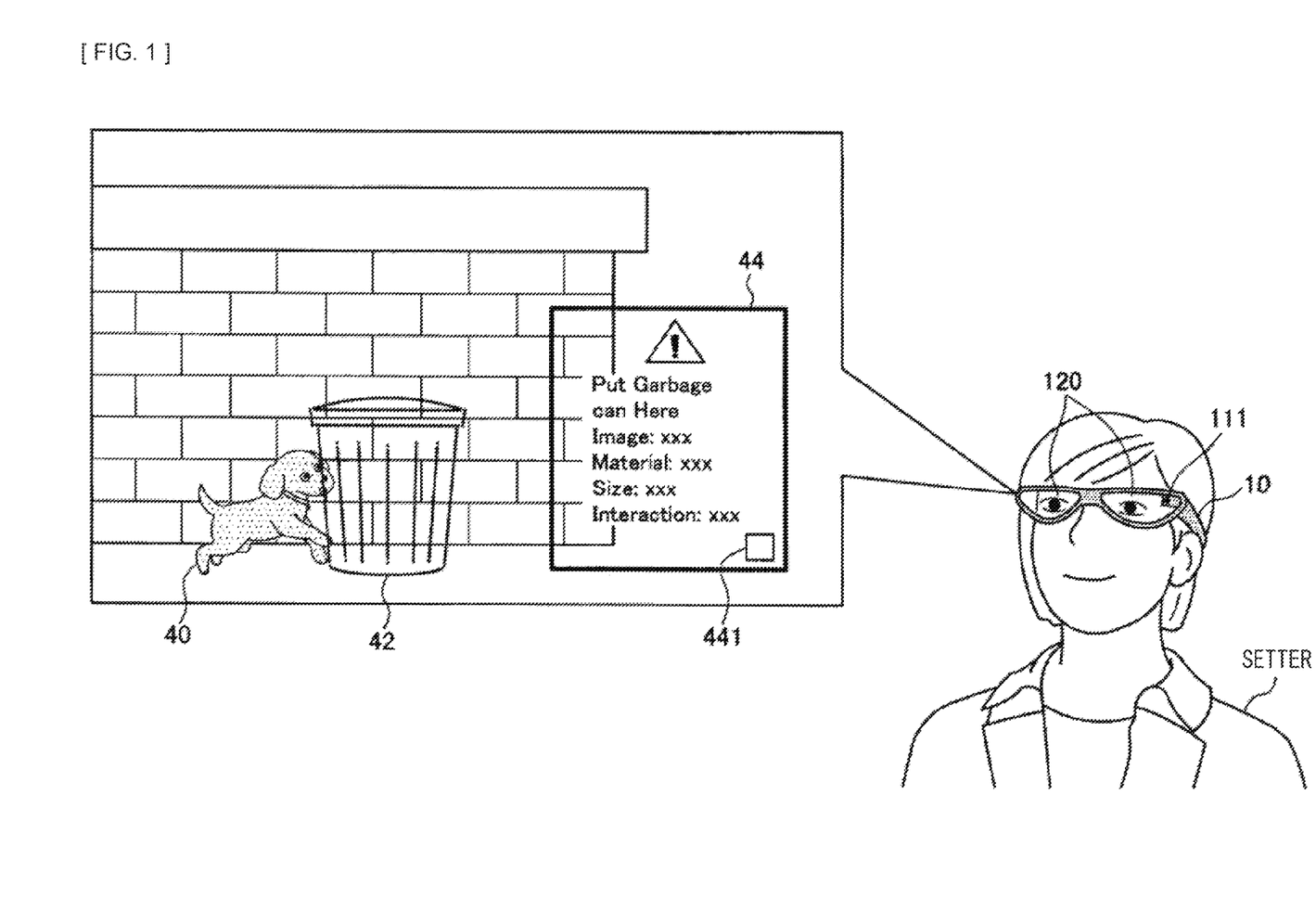
FIG. 1 is an explanatory diagram of an overview of an information processing system according to an embodiment of the present disclosure.

FIG. 1 is an explanatory diagram of an overview of an information processing system according to an embodiment of the present disclosure. An information processing terminal 10 according to the present embodiment displays, in augmented reality, information that prompts disposition of a real object with which a virtual object has an interaction, thereby supporting the disposition of the real object related to the virtual object and preventing deterioration of user experience when the virtual object is displayed.

As described above, in a case where an interaction is produced between a real object and a virtual object (for example, such as that the virtual object collides with the real object and a sound is produced, or that the virtual object sits on the real object), if the designated real object has not been disposed in a designated place in advance, a state of the virtual object becomes unnatural, which causes deterioration of user experience (for example, such as that a collision sound is produced out of nowhere, or that the displayed virtual object looks unnaturally like floating).

Furthermore, in a case of an event application performed at a particular place, an operating side has to dispose a real object necessary for the event application; however, it is difficult to dispose the designated real object in a position and direction that a developer intends and check if the disposition state is correct.

Accordingly, in the embodiment of the present disclosure, there is provided a preparation mode in which information that prompts disposition of a real object is displayed in augmented reality on the basis of information about the real object with which a virtual object has an interaction, which makes it possible to more clearly indicate the disposition (a position and direction) of the real object to a user (hereinafter, also referred to as a "setter") who prepares the real object.

Specifically, for example, as illustrated in FIG. 1, in a case where it is necessary to dispose a real object (for example, a garbage can) in a designated position in a real space, the information processing terminal 10 displays, in augmented reality, an image 42 (a virtual object) of the real object in a designated disposition place. The image 42 of the real object may be a 3D model image for the preparation mode, or may have transparency.

This enables the user to intuitively grasp the disposition place and the direction of the real object, and makes it possible to prevent a feeling of strangeness in a case where the disposition and the direction of the real object are different at the time of execution of an application. Furthermore, by the image 42 of the real object being displayed, the user is able to intuitively grasp the size of the real object as well.

It is to be noted that the information about the real object with which the virtual object has the interaction may be embedded in the application in advance. The information about the real object (such as a general name, a shape, material information, and disposition information) is inputted by the developer in implementing behavior (the interaction) of the virtual object, and is embedded in the application in association with the virtual object (for example, together with an ID of the virtual object). In the present specification, the application means software including a program that controls augmented reality display of a virtual object, information about a real object to be disposed, display data of the virtual object, sound data at the time of an interaction, etc. The information about the real object is not limited to be embedded in the application; alternatively, a database (a real object information database) may be generated separately, for example, in a server 20 or somewhere and be referred to through the information processing terminal 10 as appropriate.

Furthermore, the information processing terminal 10 may further display an image 44 that indicates detailed information about the real object to be disposed (for example, a name, a shape, a material, a size, a color, points of concern about disposition, etc.) as illustrated in FIG. 1.

Moreover, as illustrated in FIG. 1, the information processing terminal 10 may display, as a test, a virtual object 40 that has an interaction with the real object to be disposed. This makes it possible to grasp where and what interaction is actually produced and dispose the real object more accurately. Furthermore, in a case where a substitute for the designated real object is disposed, checking an interaction of a virtual object allows the substitute to be disposed not to become unnatural.

According to the present embodiment, even in a case where a developer and an executor (an operator) of an application are different, it is possible to easily set an environment in which the application is to be executed. Even in a case where a real object to be used is changed with frequent update of an application, it is possible to easily handle the case by referring to real object information embedded in the updated application or updated real object information DB.

Next, the information processing terminal 10 acquires disposition result information of the real object. For example, upon completion of the disposition of the real object, the user (the setter) performs an operation (such as a gesture operation or a voice input) to check off a checkbox 441 displayed in the image 44. In a case where the checkbox 441 has been checked off, the information processing terminal 10 records information about the disposition of the real object having been completed as disposition result information. In a case where the user has not prepared the designated real object, and has disposed a substitute, the material, the size, etc., of the substitute may be inputted. Furthermore, in a case where the user has unavoidably displaced the disposition place or the direction, how much the displacement has been is inputted. Moreover, in a case where the user has not disposed the real object, having not disposing the real object is inputted.

The disposition result information is referred to at the time of execution of the application, more specifically, in a normal mode in which the virtual object is displayed. Upon displaying the virtual object in an interaction point, the information processing terminal 10 is able to grasp the disposition state of the real object by referring to the disposition result information. This enables an appropriate interaction to be performed not to become unnatural, and makes it possible to prevent deterioration of user experience.

Specifically, the information processing terminal 10 performs a predetermined interaction in a case where the designated real object has been disposed, and, in a case where there is a change, the information processing terminal 10 performs alternative processing in accordance with the change. For example, the information processing terminal 10 changes the collision sound in accordance with the material of the substitute (for example, the collision sound is normally a metallic sound; however, in a case where the material of the real object is changed to a material that is not metal, the collision sound is changed in accordance with the changed material), adjusts the display position of the virtual object in accordance with the size of the substitute, or does not produce an interaction in a case where no real object has been disposed, which makes it possible to prevent the interaction of the virtual object from becoming unnatural.

As above, the information processing system according to the embodiment of the present disclosure has been described. It is to be noted that a method for the augmented reality display in the present embodiment is not particularly limited. For example, an eyeglass type HMD (Head Mounted Display) as illustrated in FIG. 1 may be used as the information processing terminal 10. The eyeglass type HMD is provided with a display section 120 in a lens part located in front of user's eyes when the user wears the eyeglass type HMD. The display section 120 is realized by an optically transmissive display, and the user is able to visually recognize an imaginary object while viewing a real world with a naked eye at the same time. Furthermore, the HMD is not limited to a HMD that presents an image to both eyes, and may be a HMD that presents an image only to one eye. Moreover, as illustrated in FIG. 1, the HMD is provided with an outward-facing camera 111 that captures an image in a user's gaze direction, i.e., the user's field of vision when the user wears the HMD. Furthermore, the HMD may be provided with a microphone (hereinafter, referred to as a "mike") and a speaker.

Moreover, the HMD is not limited to the eyeglass type, and may be a headband type (a type that is worn with a band running around the entire perimeter of the head, and may sometimes be provided with a band running not only the side but also the top of the head) or a helmet type (that a visor portion of a helmet corresponds to a display).

Furthermore, the information processing terminal 10 according to the present embodiment may be a video see-through HMD. In a case of a video see-through HMD, the display section 120 located in front of the user's eyes when the user wears the video see-through HMD is realized by a video transmissive display. The video transmissive display has a structure in which a field of vision is covered with a display, and allows a real world and an imaginary object to be viewed as an image captured in real time.

Figure 2:
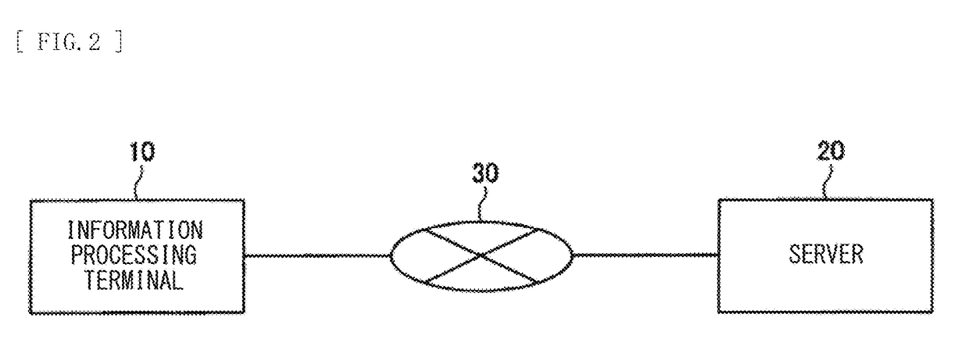
FIG. 2 is a diagram illustrating an example of an entire configuration of the information processing system according to the present embodiment.

Subsequently, an entire configuration of such an information processing system according to the present embodiment is described with reference to FIG. 2. FIG. 2 is a diagram illustrating an example of the entire configuration of the information processing system according to the present embodiment.

As illustrated in FIG. 2, the information processing system according to the present embodiment includes the information processing terminal 10 and the server 20. The information processing terminal 10 and the server 20 are coupled through a network 30, and are able to transmit and receive data.

As described above, the information processing terminal 10 is a display device that includes the display section 120 and is able to display a virtual object in augmented reality. An application that performs display of the virtual object may be received from, for example, the server 20. A specific configuration of the information processing terminal 10 will be described later with reference to FIG. 3.

The server 20 is a content server, and transmits, for example, the application that performs display of the virtual object to the information processing terminal 10. Furthermore, the server 20 may accumulate disposition result information of a real object and transmit the disposition result information to the information processing terminal 10 as necessary.

As above, the system configuration example of the information processing system according to the present embodiment has been described. It is to be noted that the above-described configuration described using FIG. 2 is just an example, and the configuration of the information processing system according to the present embodiment is not limited to this example. For example, functions that the information processing terminal 10 according to the present embodiment and the server 20 have may be realized by a single device. The configuration of the information processing system according to the present embodiment is flexibly modifiable in accordance with the specifications and operation.

2. CONFIGURATION OF INFORMATION PROCESSING TERMINAL 10

Figure 3:
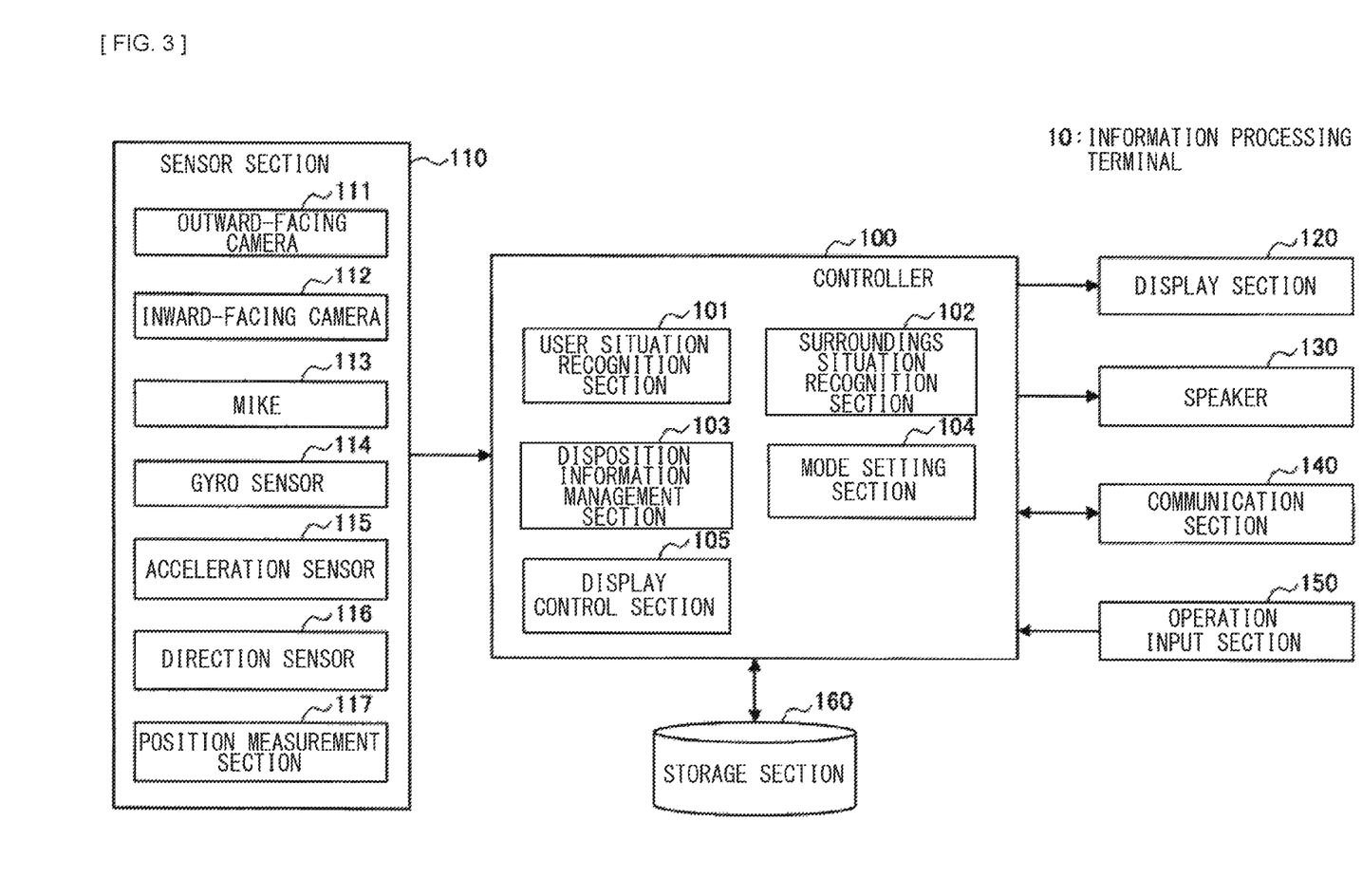
FIG. 3 is a block diagram illustrating an example of a configuration of an information processing terminal according to the present embodiment.

FIG. 3 is a block diagram illustrating an example of the configuration of the information processing terminal 10 according to the present embodiment. As illustrated in FIG. 3, the information processing terminal 10 includes a sensor section 110, a controller 100, the display section 120, a speaker 130, a communication section 140, an operation input section 150, and a storage section 160.

<2-1. Sensor Section 110>

The sensor section 110 has a function of acquiring (sensing) various information about a user or surroundings. The controller 100 of the information processing terminal 10 is able to perform head tracking, position tracking, spatial recognition, gesture recognition, voice recognition, etc. on the basis of the various information sensed by the sensor section 110.

For example, the sensor section 110 may include the outward-facing camera 111, an inward-facing camera 112, a mike 113, a gyro sensor 114, an acceleration sensor 115, a direction sensor 116, and a position measurement section 117. It is to be noted that the specific example of the sensor section 110 mentioned here is an example, and the present embodiment is not limited thereto. For example, the sensor section 110 may include an illuminance sensor, a biosensor, etc. Furthermore, each of the sensors may include a plurality of sensors.

The outward-facing camera 111 and the inward-facing camera 112 each include a lens system including an imaging lens, a diaphragm, a zoom lens, a focus lens, etc., a drive system that causes the lens system to perform focusing and zooming, a solid-state image sensor array that photoelectrically converts imaging light obtained by the lens system and generates an imaging signal, etc. The solid-state image sensor array may be realized by, for example, a CCD (Charge Coupled Device) sensor array or a CMOS (Complementary Metal Oxide Semiconductor) sensor array.

It is desirable that the outward-facing camera 111 be set to an angle of view and a direction that include at least an area corresponding to the user's field of vision. Furthermore, a plurality of the outward-facing cameras 111 may be provided. Moreover, the outward-facing camera 111 may include a depth camera that is able to acquire a depth map by sensing.

The mike 113 collects the user's voice and an environment sound of its surroundings, and outputs them as voice data to the controller 100.

The gyro sensor 114 is realized by, for example, a 3-axis gyro sensor, and detects an angular velocity (a rotation speed).

The acceleration sensor 115 is realized by, for example, a 3-axis acceleration sensor, and detects an acceleration at the time of movement.

The direction sensor 116 is realized by, for example, a 3-axis geomagnetism sensor (a compass), and detects an absolute direction (an orientation).

The position measurement section 117 calculates a self-location of the information processing terminal 10. For example, the position measurement section 117 may use so-called SLAM (simultaneous localization and mapping) as a method for self-localization.

Furthermore, the position measurement section 117 may detect the current position of the information processing terminal 10 on the basis of a signal acquired from the outside. Specifically, for example, the position measurement section 117 may be realized by a GPS (Global Positioning System) positioning section, and receive a radio wave from a GPS satellite and detect a location in which the information processing terminal 10 exists. Moreover, the position measurement section 117 may detect the location by means of, for example, Wi-Fi (registered trademark), Bluetooth (registered trademark), transmission and reception with a mobile phone, a PHS, a smartphone, or the like, or short-range communication or the like.

<2-2. Controller 100>

The controller 100 functions as an arithmetic processing device or a control device, and controls all operations in the information processing terminal 10 in accordance with various programs. The controller 100 is realized by an electronic circuit, for example, such as a CPU (Central Processing Unit) or a microprocessor. Furthermore, the controller 100 may include a ROM (Read Only Memory) that stores a program, a calculation parameter, etc. that are used and a RAM (Random Access Memory) that temporarily stores a parameter, etc. that change as appropriate.

The controller 100 performs head tracking, position tracking, spatial recognition, gesture recognition, voice recognition, etc., and may display a virtual object appropriately in accordance with an application. More specifically, the controller 100 according to the present embodiment functions as a user situation recognition section 101, a surroundings situation recognition section 102, a disposition information management section 103, a mode setting section 104, and a display control section 105.

(User Situation Recognition Section 101)

The user situation recognition section 101 recognizes, as a user situation, a position (for example, a position in a room, a self-location), a posture, an action, etc. of the user on the basis of various sensing data acquired by the sensor section 110. Furthermore, the user situation recognition section 101 may perform recognition of a gesture or a voice. Moreover, the user situation recognition section 101 is also able to perform tracking of a change in direction, a movement, etc. of a face (head tracking, position tracking).

(Surroundings Situation Recognition Section 102)

The surroundings situation recognition section 102 performs object recognition, spatial recognition, etc. in surroundings as a surroundings situation on the basis of various sensing data acquired by the sensor section 110.

(Disposition Information Management Section 103)

The disposition information management section 103 performs management of information about disposition of a real object. For example, the disposition information management section 103 acquires disposition result information of a real object by the user on the basis of various sensing data acquired by the sensor section 110, and stores the disposition result information in the storage section 160. Furthermore, the disposition information management section 103 may transmit the disposition result information accumulated in the storage section 160 to the server 20.

(Mode Setting Section 104)

The mode setting section 104 performs setting of the preparation mode or the normal mode as an operation mode of an application. The preparation mode is a mode in which in a case where the setter or someone prepares and disposes a real object with which a virtual object has an interaction in advance, information about the disposition of the real object is displayed in augmented reality. The normal mode is a mode in which the virtual object that has the interaction with the disposed real object is displayed; for example, in a case of a game application, a player (a general user) is a subject. The mode setting section 104 may set the operation mode to a mode selected by a user having predetermined authority (for example, the setter). It is to be noted that the same person may use the preparation mode and the normal mode.

(Display Control Section 105)

The display control section 105 performs augmented reality display control of a virtual object. Specifically, the display control section 105 superimposes and displays a virtual object on a real space in accordance with the application with use of the display section 120. At this time, on the basis of recognition results of the user situation recognition section 101 and the surroundings situation recognition section 102, the display control section 105 may perform display control to make the virtual object look as if it actually exists in the real space. Specifically, the display control section 105 changes the virtual object in accordance with the user's head movement, a change in the posture, the position, etc. (what is called a head tracking function and a position tracking function).

In a case where the preparation mode has been set by the mode setting section 104, on the basis of information about a real object with which a virtual object has an interaction, the display control section 105 displays, in augmented reality, information that supports disposition of the real object. The information about the real object with which the virtual object has the interaction (hereinafter, also referred to as the "real object information") is, as described above, inputted by the developer upon defining behavior (the interaction) of the virtual object. Information about the behavior of the virtual object includes information about an interaction point (for example, a relative position from a reference point in a predetermined area). Furthermore, the real object information includes alternative processing in a case where there is not the real object in addition to a general name, a shape, a material, disposition information, etc. Here, FIG. 4 illustrates an example of the real object information according to the present embodiment.

Figure 4:
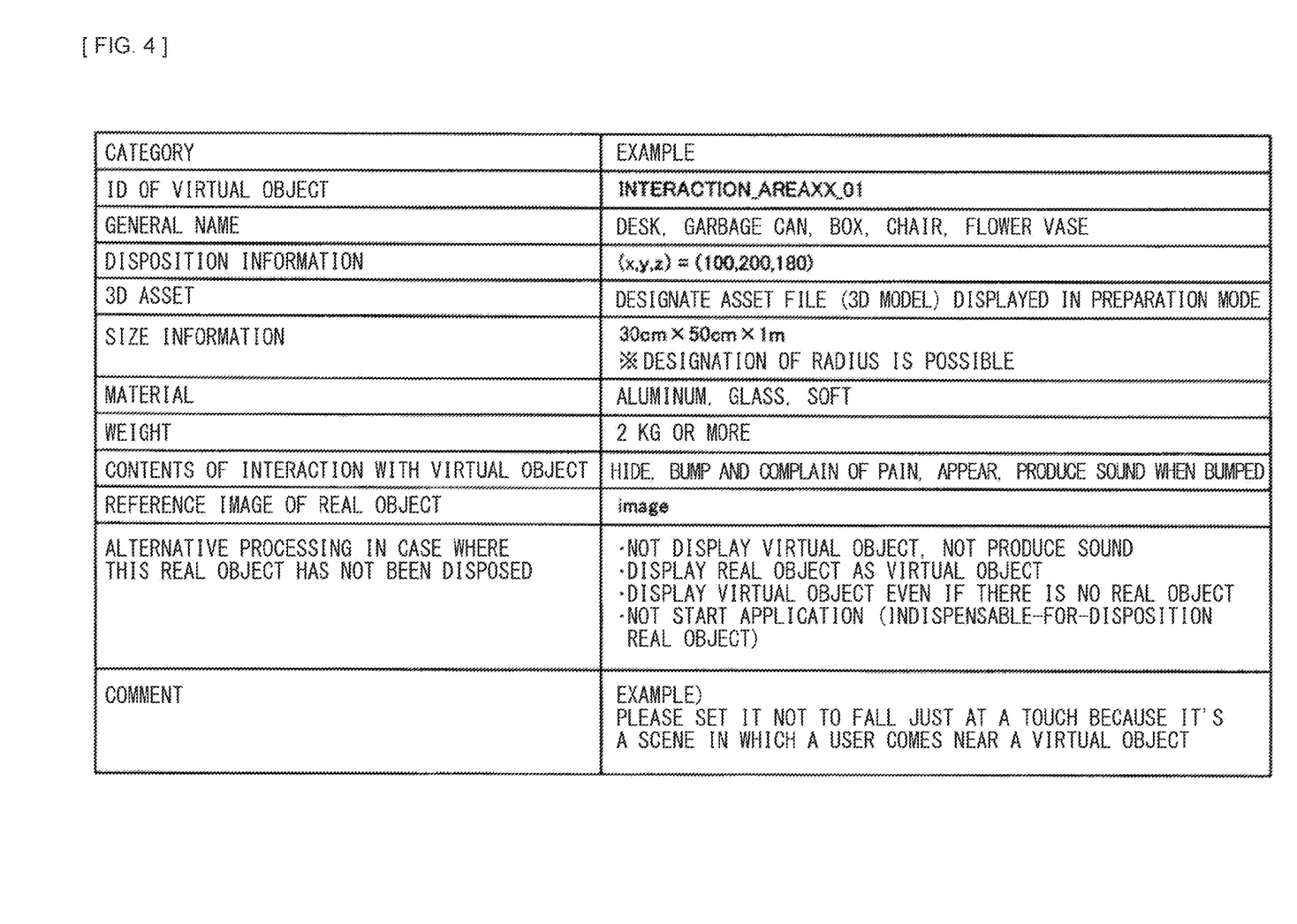
FIG. 4 is a diagram illustrating an example of real object information according to the present embodiment.

As illustrated in FIG. 4, categories of the real object information are assumed to include, for example, an ID of an associated virtual object, the general name of a real object, disposition information (such as a position, a direction, etc.), 3D asset (an example of a virtual object of a real object used in the preparation mode), size information, a material, a weight, a color, contents of interaction with a virtual object, a reference image (an illustration, a photo, etc.) of a real object, alternative processing in a case where a concerned real object has not been disposed, a comment about disposition from a developer, etc.

Disposition information may be, for example, information about a relative position and a direction from a predetermined reference point in an area. The predetermined reference point may be, for example, the entrance of a room, a window, a predetermined piece of furniture, or the like. In a case of an event application to be performed in a particular place, a spot where an interaction is produced (an interaction point) may be set in advance, and thus disposition (a position, a direction, etc.) of an associated virtual object may also be set at the same time.

Examples of alternative processing when a real object has not been disposed include not displaying a virtual object, not producing a sound, displaying the real object as a virtual object, displaying a virtual object even if there is no real object, not starting an application (not executing an application for the normal mode), etc.

It is to be noted that the real object information illustrated in FIG. 4 is an example, and the present embodiment is not limited thereto. For example, the real object information may include environment information about surroundings of the real object (such as making its surroundings bright or dark).

Furthermore, in a case where the normal mode has been set by the mode setting section 104, the display control section 105 performs augmented reality display of a virtual object that has an interaction with the disposed real object. The application is embedded with an interaction point (designation of an area, designation of a place in the area), contents of the interaction, display data of a 3D model or the like of the virtual object that has the interaction, sound effect data at the time of the interaction, preferred real object information in the interaction point, etc. On the basis of these pieces of information, the display control section 105 performs display control of moving the virtual object at the designated place (the interaction point). At this time, the display control section 105 refers to disposition result information acquired during the preparation mode, and determines behavior of the virtual object in accordance with a disposition result. That is, on the basis of the disposition result, the display control section 105 performs alternative processing as necessary, which allows an action of the virtual object or a sound effect not to become unnatural.

The disposition result information may be stored in the storage section 160, or may be acquired from the server 20. The disposition result information is assumed to include not only information about the presence or absence of disposition of a real object, such as that whether or not a designated real object has been disposed as designated, but also information that another real object (a substitute) has been disposed, such as that "a real object having the same shape but a different material has been disposed" or that "a real object having the same shape and the same material but a smaller size has been disposed". It is to be noted that it is also possible to recognize disposition of a real object in real time by means of the outward-facing camera 111 and acquire a difference from favorable disposition of a real object set in advance in an application. However, in a case where a recognition processing load is large, and it is difficult to judge the material and the weight or accurately grasp the difference from a favorable real object set in advance, it is more desirable to refer to the disposition result information acquired during the preparation mode. Furthermore, in a case of real-time recognition, a state of disposition of a real object is not known without actually going to a place of the disposition; therefore, also from a point of view that the state of disposition of the real object is able to be grasped in advance in a case where an application is started in the normal mode, it is preferable to refer to the disposition result information acquired during the preparation mode.

It is to be noted that in control of an interaction of a virtual object, it is also possible to output a sound effect, a vibration, or the like. At the time of the interaction of the virtual object, the controller 100 may perform control of outputting a prescribed sound effect from the speaker 130. Furthermore, at this time, the controller 100 may refer to the disposition result information and output a sound effect in accordance with the material, etc. of an actually disposed real object.

<2-3. Display Section 120>

The display section 120 has a function of performing augmented reality display of a virtual object. For example, the display section 120 is realized by an optically transmissive display, and uses, for example, a hologram optical technique to perform display. Furthermore, the display section 120 may be realized by an LCD (Liquid Crystal Display) device, an OLED (Organic Light Emitting Diode) device, or the like. Moreover, the display section 120 may be of a transmissive type, a semi-transmissive type, or a non-transmissive type. Furthermore, the optical transmittance of the display section 120 may be controlled by the controller 100.

<2-4. Speaker 130>

The speaker 130 reproduces an audio signal in accordance with control by the controller 100.

<2-5. Communication Section 140>

The communication section 140 is a communication module for performing transmission and reception of data with another device via wired/wireless means. The communication section 140 performs wireless communication directly or through a network access point with an external device, for example, by means such as a wired LAN (Local Area Network), a wireless LAN, Wi-Fi (registered trademark) (Wireless Fidelity), infrared communication, Bluetooth (registered trademark), and short-range/non-contact communication.

<2-6. Operation Input Section 150>

The operation input section 150 is realized by an operating member having a physical structure, such as a switch, a button, or a lever.

<2-7. Storage Section 160>

The storage section 160 is realized by a ROM (Read Only Memory) that stores a program, a calculation parameter, etc. that are used in the above-described processing by the controller 100 and a RAM (Random Access Memory) that temporarily stores a parameter, etc. that change as appropriate.

Furthermore, the storage section 160 stores spatial recognition information (spatial map data), an application, a disposition result information DB (database). The disposition result information DB may be stored in the server 20.

As above, the configuration of the information processing terminal 10 according to the present embodiment has been specifically described. It is to be noted that the configuration of the information processing terminal 10 according to the present embodiment is not limited to the example illustrated in FIG. 3. For example, the information processing terminal 10 may include a plurality of devices. For example, the information processing terminal 10 may have a system configuration including an HMD worn by a user and a smartphone. In this case, for example, the functions that the controller 100 has may be provided to the smartphone, and information presentation through the HMD may be performed in accordance with control by the smartphone.

Furthermore, at least a portion of the sensor section 110 may be an external sensor (an environment-side sensor, for example, such as a camera set in a room, a depth sensor, a mike, an infrared sensor, or a luminance sensor).

Moreover, at least some of the functions that the controller 100 of the information processing terminal 10 has may exist in another device with which a communication connection is established through the communication section 140. For example, at least some of the functions that the controller 100 of the information processing terminal 10 has may be provided in an intermediate server or a cloud server (the server 20) or the like on the Internet.

3. OPERATION PROCESSING

Subsequently, operation processing of the information processing system according to the present embodiment is specifically described with drawings.

<3-1. Operation Processing in Preparation Mode>

Figure 5:
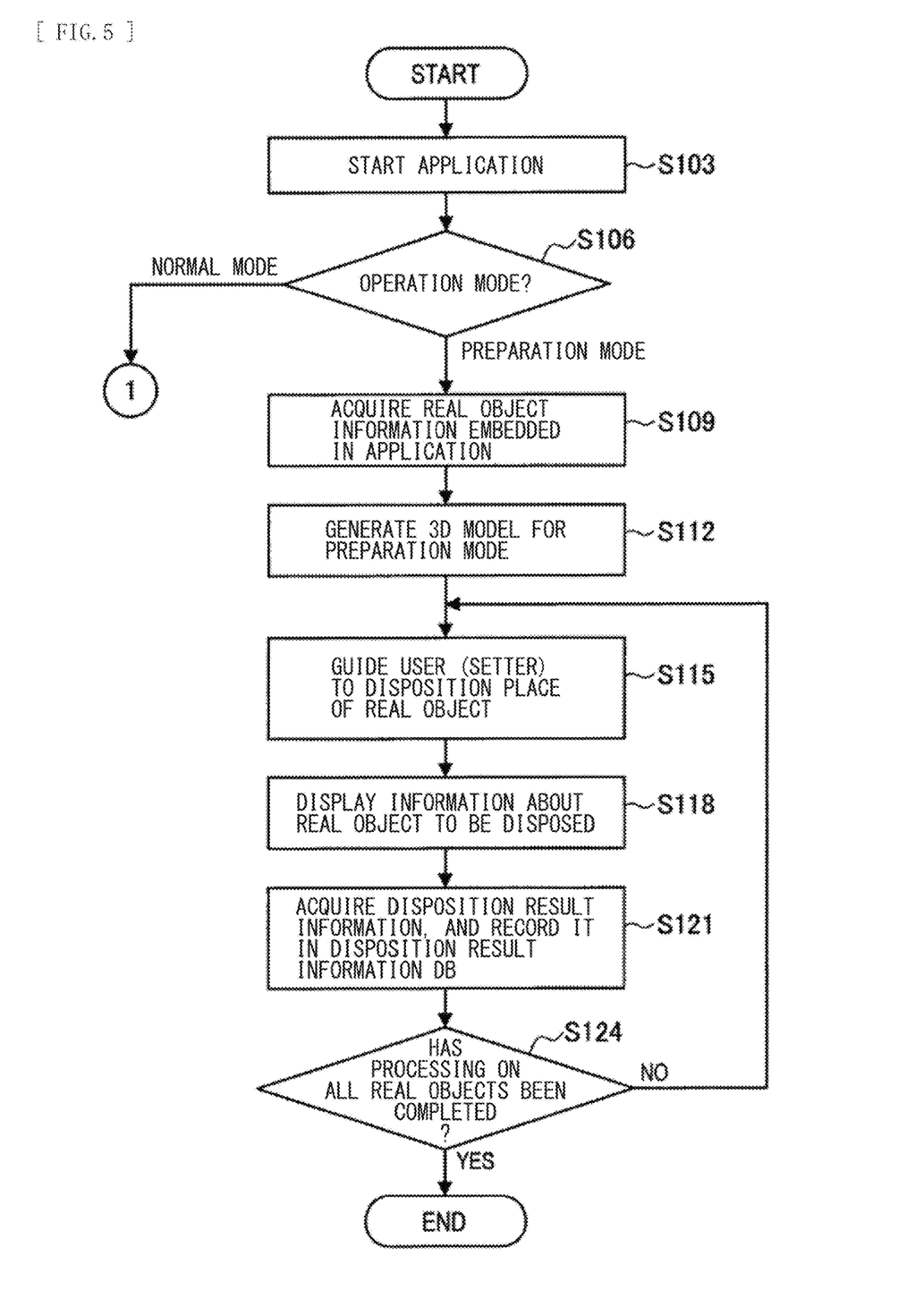
FIG. 5 is a flowchart illustrating an example of the flow of operation processing in a preparation mode according to the present embodiment.

FIG. 5 is a flowchart illustrating an example of the flow of operation processing in the preparation mode according to the present embodiment. As illustrated in FIG. 5, first, the controller 100 of the information processing terminal 10 starts an application (step S103), and checks the setting of the operation mode (step S106).

Next, in a case of setting to the preparation mode (step S106/the preparation mode), the display control section 105 acquires real object information embedded in the application (step S109). Alternatively, the display control section 105 acquires the real object information from the server 20.

Then, the display control section 105 generates a 3D model for the preparation mode (which is an example of a virtual object of the real object used in the preparation mode, and may not necessarily be a 3D image) on the basis of the acquired real object information (step S112). Generating display for the preparation mode from the real object information (a real object parameter) in this way makes it possible to reduce man-hours to create an instruction for each application and create an application exclusively for preparation.

Next, the controller 100 starts control of guiding a user (a setter) to a disposition place of the real object on the basis of disposition information extracted from the real object information (step S115). Specifically, the controller 100 determines the user's self-location by means of the SLAM technique or the like, and guides the user to a designated disposition place using the display section 120 or the speaker 130. At this time, the controller 100 may notify the user of information about the real object to be brought to the disposition place before the guiding is started. For example, the controller 100 may display a reference image of the real object and also notify a message such as that "Please move to the back of the room with a garbage can like this". Furthermore, the controller 100 may display the information about the real object to be disposed during the guiding.

Then, in a case where the user has moved to the disposition place in accordance with the guiding, the display control section 105 displays the real object information about the real object to be disposed (step S118). Specifically, as described with reference to FIG. 1, a virtual object of the real object (the generated 3D model) is displayed in augmented reality in the designated disposition place to more clearly indicate the disposition place of the real object. At this time, the display control section 105 displays detailed information about the real object as well, or displays, as a test, the virtual object that has an interaction with the real object, thereby making it possible to further support disposition of the real object. This enables even the setter who does not know contents of the application to dispose the real object necessary for the application in a position and direction that a developer intends.

Next, the disposition information management section 103 acquires feedback about the disposition of the real object (in the present specification, referred to as disposition result information), and records the disposition result information in the disposition result information DB (step S121). The disposition result information DB may have been stored in the storage section 160, or may have been stored in the server 20. In a case where the disposition of the real object is performed by a plurality of members of staff, the result (the disposition result information) may be made sharable on a network. A method of acquiring the disposition result information is not particularly limited; however, for example, as illustrated in FIG. 1, in a case where a designated real object has been disposed, the checkbox 441 may be checked off. In a case where the disposition has not been able to be performed, this process may end without checking off, or information that the disposition has not been able to be performed may be inputted. Furthermore, in a case where another real object (a substitute) has been disposed, such as that "a real object having the same shape but a different material has been disposed" or that "a real object having the same shape and the same material but a smaller size has been disposed", the user (the setter) may input information about the substitute and check off the checkbox.

The processes in the steps S115 to S112 described above are repeated with respect to all real objects set in the real object information (step S124). It is to be noted that as described above, in a case where the disposition is performed by a plurality of members of staff, the members of the staff may share disposition result information, and a real object that has been disposed by another member of the staff may be removed from subjects of the guiding as appropriate.

As above, the operation processing in the preparation mode has been specifically described.

<3-2. Operation Processing in Normal Mode>

Figure 6:
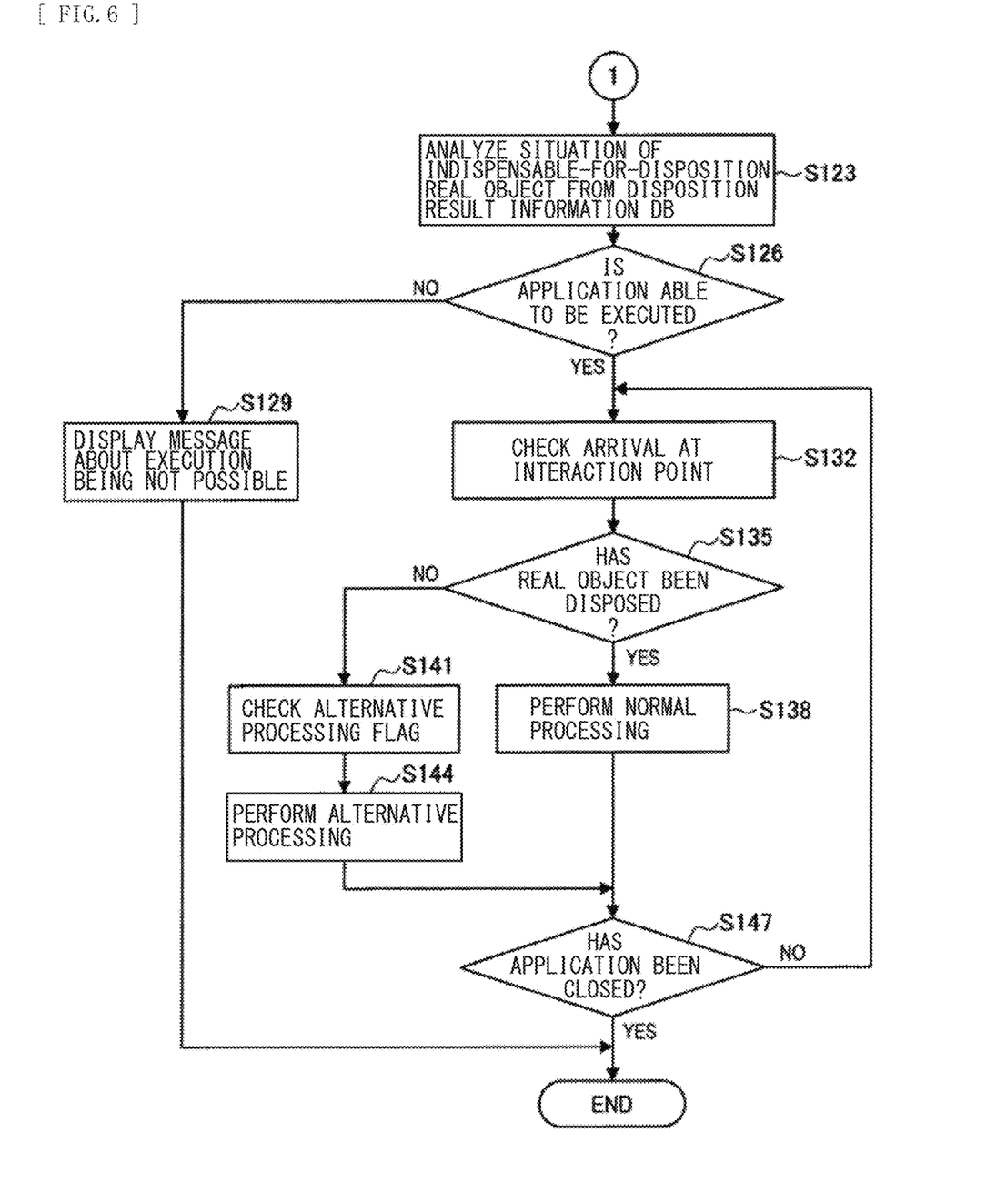
FIG. 6 is a flowchart illustrating an example of the flow of operation processing in a normal mode according to the present embodiment.

FIG. 6 is a flowchart illustrating an example of the flow of operation processing in the normal mode according to the present embodiment. In step S106 illustrated in FIG. 5, in a case where the normal mode is set (the step S106/the normal mode), as illustrated in FIG. 6, the controller 100 analyzes the situation of an indispensable-for-disposition real object from the disposition result information DB (step S123). The indispensable-for-disposition real object is a real object indispensable for UX (User Experience) of an application, and is set by a developer in advance. Information about the indispensable-for-disposition real object is included in, for example, real object information embedded in the application.

Next, the controller 100 determines whether or not the application is able to be executed (step S126). Specifically, in a case where the indispensable-for-disposition real object has not been disposed, the controller 100 determines that the application is not able to be executed, and, in a case where the indispensable-for-disposition real object has been disposed, the controller 100 determines that the application is able to be executed.

Then, in a case where it has been determined that the application is not able to be executed (step S126/No), the display control section 105 presents a user (a player) with a message about the execution being not possible (step S129).

For example, the display control section 105 gives a notification such as that "An issue occurred. Please call staff". This makes it possible to avoid the starting of the application (for example, causing a game to go on) in a situation where the indispensable-for-disposition real object has not been disposed (i.e., a situation where user experience deteriorates).

Meanwhile, in a case where it has been determined that the application is able to be executed (step S126/Yes), the display control section 105 starts the execution of the application in the normal mode (in a case of an event application, starts introduction, etc. for the player), and checks whether or not the player has arrived at a designated interaction point (step S132).

Next, in a case where the arrival at the interaction point has been confirmed, the controller 100 refers to the disposition result information DB and checks whether or not a designated real object has been disposed in the interaction point (step S135).

Then, in a case where the designated real object has been disposed (step S135/Yes), the controller 100 performs prescribed normal processing (a predefined interaction of a virtual object) (step S138).

Meanwhile, in a case where the designated real object has not been disposed (step S135/No), the controller 100 checks an alternative processing flag (i.e., whether or not alternative processing has been registered in the real object information) (step S141), and, in a case where the alternative processing has been registered, the controller 100 performs the alternative processing (step S144). The alternative processing includes alternative processing appropriate for a substitute in a case where the substitute has been disposed in addition to alternative processing in a case where a real object has not been disposed.

Examples of the alternative processing include not displaying a virtual object, generating a 3D model of an image of a real object and displaying the 3D model as a virtual object, changing an interaction (for example, changing to an interaction unrelated to a real object), etc. Examples of the changing to an interaction unrelated to a real object include changing, for example, behavior of popping out of the real object to behavior of popping out of a floor or a wall.

Thus, even in a case where the operating side has not been able to dispose the real object unexpectedly, causing a virtual object to perform alternative behavior makes it possible to provide the application without making the behavior look unnatural and bringing the user back to reality.

Such an information processing system according to the present embodiment is applicable to, for example, an AR game event using a reality space as described below, and in a case where a real object has not been disposed, it is possible to prevent a feeling of strangeness by performing given alternative processing.

An interaction where a virtual object (such as a game character) collides with a property such as a garbage can in a reality space, and a sound is produced An interaction where the game character that is a virtual object gives an explanation about the real space (such as an explanation about a painting that is a real object)

An interaction that makes it appear as if a user is sharing a scene, such as that the game character that is a virtual object looks at "a book" or "a poster" (a real object) in the real space and gets a surprise or starts laughing An interaction where the game character that is a virtual object runs around and stumbles over a real object In a case where a game is caused to go on by the game character that is a virtual object guiding a user to a real object and the user having an interaction with the real object (for example, such as pushing a button, holding his/her hand over a sensor, or picking up an item) (the game is not able to go on further unless a real object is disposed; however, the user's interaction is produced by alternative processing (for example, display of a virtual object of a button), which makes it possible to cause the game to go on)

Figure 7:
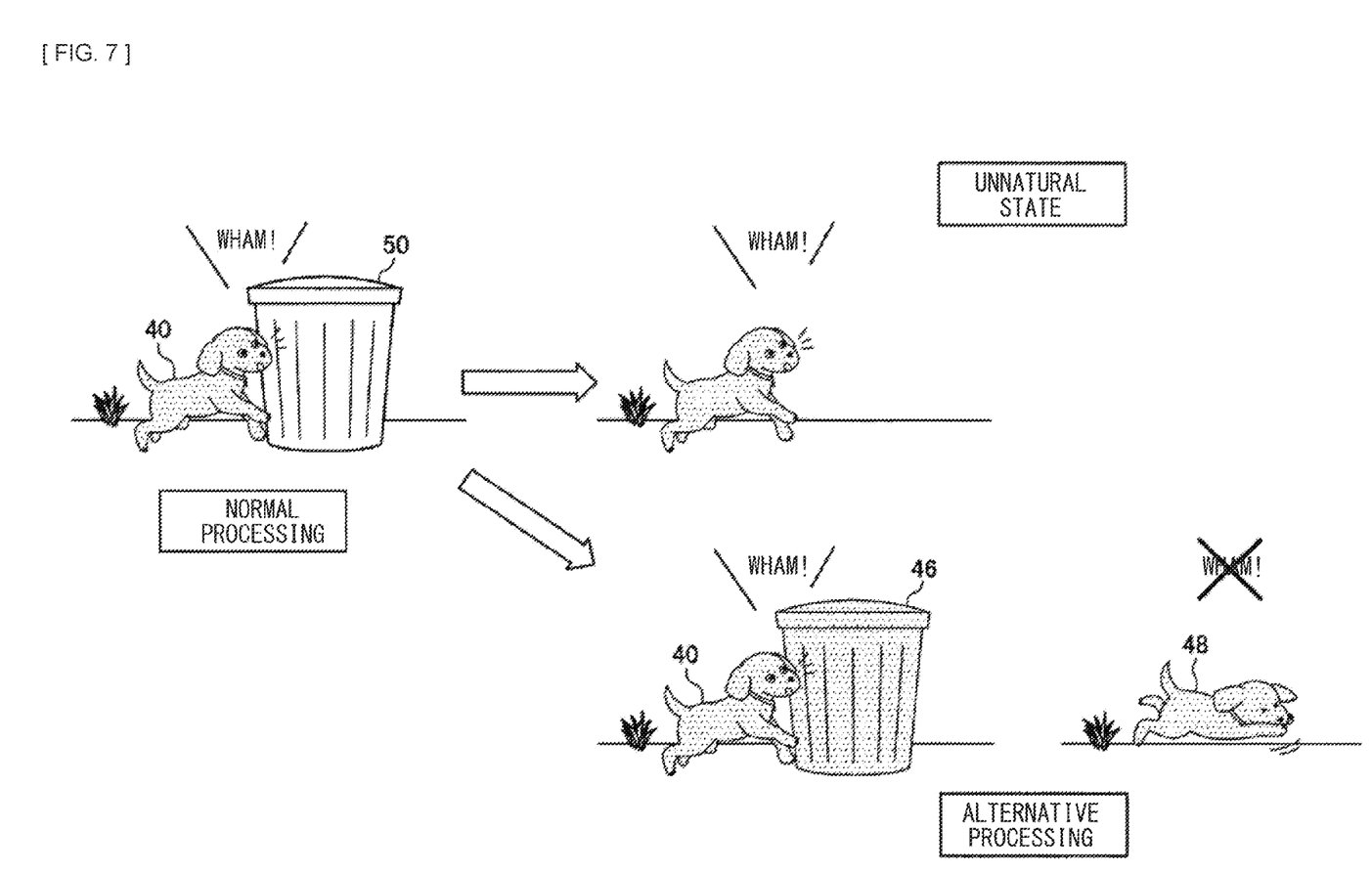
FIG. 7 is an explanatory diagram of alternative processing in a case where a real object has not been disposed according to the present embodiment.

Of the examples described above, the "interaction where a virtual object (such as a game character) collides with a property such as a garbage can in a reality space, and a sound is produced" is described with reference to FIG. 7. As illustrated in a left part of FIG. 7, in a case where a designated real object 50 has been disposed in a designated place, there is presented normal processing, i.e., an interaction where the virtual object 40 (such as a game character) collides with the real object 50, and a sound is produced. Meanwhile, in a case where it has been found by referring to the disposition result information DB that the designated real object 50 has not been disposed, if the normal processing is performed, the interaction becomes unnatural (a collision action and sound is produced out of nowhere) as illustrated in an upper right part of FIG. 7. Accordingly, performing alternative processing as illustrated in a lower right part of FIG. 7 makes it possible to prevent a feeling of strangeness. Specifically, displaying a virtual object 46 of the real object, eliminating the collision sound, or changing an action of a virtual object 48 to an action unrelated to the real object, such as behavior of slipping and falling on the spot makes it possible to prevent the feeling of strangeness in a case where the real object has not been disposed.

The processes in the steps S132 to S143 described above are repeated at each interaction point until the application has been closed (step S146).

As above, the example of the operation processing according to the present embodiment has been described. It is to be noted that the operation processing illustrated in FIGS. 5 and 6 is an example, and the present disclosure is not limited to the example illustrated in FIGS. 5 and 6. For example, the present disclosure is not limited to the order of steps illustrated in FIGS. 5 and 6. At least some of the steps may be performed in parallel, or may be performed in reverse order. For example, the step S112 in FIG. 5 may be performed after the guiding illustrated in the step S115.

Furthermore, all the processes illustrated in FIGS. 5 and 6 may not necessarily be performed. For example, only a disposition place (such as an area name) may be presented without the guiding illustrated in the step S115 in FIG. 5.

Moreover, all the processes illustrated in FIGS. 5 and 6 may not necessarily be performed by a single device. For example, the acquisition of the real object information illustrated in the step S109 in FIG. 5, the generation of the 3D model illustrated in the step S112, and the situation analysis of the indispensable-for-disposition real object illustrated in the step S123 in FIG. 6 may be performed by the server 20, and the other processes may be performed by the information processing terminal 10.

4. CONCLUSION

As described above, in the information processing system according to the embodiment of the present disclosure, it is possible to support disposition of a real object related to a virtual object and prevent deterioration of user experience in a case where the virtual object is displayed.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

For example, it is also possible to create a computer program causing hardware such as the CPU, the ROM, and the RAM built into the above-described information processing terminal 10 or the server 20 to fulfill the functions of the information processing terminal 10 or the server 20. Furthermore, there is also provided a computer-readable storage medium in which the computer program is stored.

In addition, the effects described herein are merely illustrative and exemplary, and not limitative. That is, the technology according to the present disclosure may exert other effects that are apparent to those skilled in the art from the description herein, in addition to the effects described above or in place of the effects described above.

It is to be noted that the present technology may take configurations as follow.

(1)

An information processing apparatus including a controller that performs:

control of displaying information in augmented reality in a preparation mode in which a real object is disposed, the information that supports disposition of the real object on the basis of prerecorded information about the real object with which a virtual object has an interaction; and control of recording disposition result information of the real object in a disposition result information database referred to in a normal mode in which the virtual object that has the interaction with the disposed real object is displayed.

(2)

The information processing apparatus according to (1), in which the controller displays information that indicates the disposition of the real object as the information that supports the disposition of the real object.

(3)

The information processing apparatus according to (1) or (2), in which the controller displays, in augmented reality, a virtual object of the real object in a designated disposition place in a real space as the information that supports the disposition of the real object.

(4)

The information processing apparatus according to (1) or (2), in which the controller displays, as the information that supports the disposition of the real object, a virtual object of the real object and the virtual object that has the interaction with the real object in a designated disposition place in a real space.

(5)

The information processing apparatus according to any one of (1) to (4), in which the controller performs display for guiding a user to a disposition place of the real object as the information that supports the disposition of the real object.

(6)

The information processing apparatus according to (5), in which the controller gives a notification that prompts the user to prepare the real object to be set in the disposition place upon starting the guiding.

(7)

The information processing apparatus according to any one of (1) to (6), in which the controller displays detailed information about the real object as the information that supports the disposition of the real object.

(8)

The information processing apparatus according to (7), in which the detailed information about the real object includes at least any one of a name of the real object, a 3D asset, size information, material information, weight information, interaction contents, a captured image, an illustration image, or a comment.

(9)

The information processing apparatus according to any one of (1) to (8), in which the information about the real object is stored in association with the virtual object.

(10)

The information processing apparatus according to any one of (1) to (9), in which in the normal mode, the controller performs display control of the virtual object in a designated place set in accordance with the disposition result information of the real object stored in the disposition result information database.

(11)

The information processing apparatus according to (10), in which in a case where it is determined from the disposition result information of the real object that the real object specified has not been disposed in the preparation mode, the controller stops execution of the normal mode.

(12)

The information processing apparatus according to (10) or (11), in which in a case where it is confirmed from the disposition result information of the real object that the real object designated has not been disposed in an interaction point, the controller performs designated alternative processing for display of the virtual object.

(13)

The information processing apparatus according to (12), in which as the alternative processing, the controller stops display of the virtual object, or changes to an interaction unrelated to the real object.

(14)

The information processing apparatus according to (12), in which as the alternative processing, the controller displays a virtual object of the real object in a designated disposition place, and executes a set interaction of the virtual object.

(15)

The information processing apparatus according to (10) or (11), in which in a case where it is confirmed from the disposition result information of the real object that a real object different from a designated real object has been disposed in an interaction point, the controller changes to an interaction appropriate for the different real object.

(16)

The information processing apparatus according to (15), in which the controller changes an interaction of the virtual object in accordance with at least either material information or size information of the different real object.

(17)

The information processing apparatus according to (16), in which the changing of the interaction of the virtual object includes changing of an action of the virtual object or changing of a sound.

(18)

An information processing method that is performed by a processor, the information processing method including:

displaying information in augmented reality in a preparation mode in which a real object is disposed, the information that supports disposition of the real object on the basis of prerecorded information about the real object with which a virtual object has an interaction; and recording disposition result information of the real object in a disposition result information database referred to in a normal mode in which the virtual object that has the interaction with the disposed real object is displayed.

(19)

A program causing a computer to function as a controller that performs:

when in preparation mode in which a real object is disposed, control of displaying, in augmented reality, information that supports disposition of the real object on the basis of prerecorded information about the real object with which a virtual object has an interaction; and control of recording disposition result information of the real object in a disposition result information database referred to when in normal mode in which the virtual object that has the interaction with the disposed real object is displayed.

REFERENCE SIGNS LIST 10 information processing terminal
100 controller
101 user situation recognition section
102 surroundings situation recognition section
103 disposition information management section
104 mode setting section
105 display control section
110 sensor section
111 outward-facing camera
112 inward-facing camera
113 mike
114 gyro sensor
115 acceleration sensor
116 direction sensor
117 position measurement section
120 display section
130 speaker
140 communication section
150 operation input section
160 storage section
20 server

The invention claimed is:

1. An information processing apparatus comprising:
a controller configured to:
perform control of displaying, in augmented reality in a preparation mode in which a real object is disposed, information that supports disposition of the real object on a basis of prerecorded information about the real object with which a virtual object has an interaction; and
perform control of recording disposition result information of the disposition of the real object in the preparation mode in a disposition result information database referred to in a normal mode in which the virtual object that has the interaction with the disposed real object is displayed,
wherein in a case where it is confirmed from the disposition result information of the real object that the real object designated has not been disposed in an interaction point, the controller is further configured to perform designated alternative processing for display of the virtual object.

2. The information processing apparatus according to claim 1, wherein the controller is further configured to perform control of displaying information that indicates the disposition of the real object as the information that supports the disposition of the real object.

3. The information processing apparatus according to claim 1, wherein the controller is further configured to perform control of displaying, in augmented reality, a virtual object of the real object in a designated disposition place in a real space as the information that supports the disposition of the real object.

4. The information processing apparatus according to claim 1, wherein the controller is further configured to perform control of displaying, as the information that supports the disposition of the real object, a virtual object of the real object and the virtual object that has the interaction with the real object in a designated disposition place in a real space.

5. The information processing apparatus according to claim 1, wherein the controller is further configured to perform control of displaying for guiding a user to a disposition place of the real object as the information that supports the disposition of the real object.

6. The information processing apparatus according to claim 5, wherein the controller is further configured to perform control of giving a notification that prompts the user to prepare the real object to be set in the disposition place upon starting the guiding.

7. The information processing apparatus according to claim 1, wherein the controller is further configured to perform control of displaying detailed information about the real object as the information that supports the disposition of the real object.

8. The information processing apparatus according to claim 7, wherein the detailed information about the real object includes at least any one of a name of the real object, a 3D asset, size information, material information, weight information, interaction contents, a captured image, an illustration image, or a comment.

9. The information processing apparatus according to claim 1, wherein the information about the real object is stored in association with the virtual object.

10. The information processing apparatus according to claim 1, wherein in the normal mode, the controller is further configured to perform display control of the virtual object in a designated place set in accordance with the disposition result information of the real object stored in the disposition result information database.

11. The information processing apparatus according to claim 10, wherein in a case where it is determined from the disposition result information of the real object that the real object specified has not been disposed in the preparation mode, the controller is further configured to stop execution of the normal mode.

12. The information processing apparatus according to claim 10, wherein in a case where it is confirmed from the disposition result information of the real object that a real object different from a designated real object has been disposed in an interaction point, the controller is further configured to change to an interaction appropriate for the different real object.

13. The information processing apparatus according to claim 12, wherein the controller is further configured to change an interaction of the virtual object in accordance with at least either material information or size information of the different real object.

14. The information processing apparatus according to claim 13, wherein the changing of the interaction of the virtual object includes changing of an action of the virtual object or changing of a sound.

15. The information processing apparatus according to claim 1, wherein as the alternative processing, the controller is further configured to stop display of the virtual object, or change to an interaction unrelated to the real object.

16. The information processing apparatus according to claim 1, wherein as the alternative processing, the controller is further configured to perform control of displaying a virtual object of the real object in a designated disposition place, and execute a set interaction of the virtual object.

17. The information processing apparatus according to claim 1, wherein the disposition result information includes information about presence or absence of disposition of the real object.

18. An information processing method that is performed by a processor, the information processing method comprising:
 displaying, in augmented reality in a preparation mode in which a real object is disposed, information that supports disposition of the real object on a basis of prerecorded information about the real object with which a virtual object has an interaction;
 recording disposition result information of the disposition of the real object in the preparation mode in a disposition result information database referred to in a normal mode in which the virtual object that has the interaction with the disposed real object is displayed; and
 in a case where it is confirmed from the disposition result information of the real object that the real object designated has not been disposed in an interaction point, performing designated alternative processing for display of the virtual object.

19. A non-transitory computer-readable medium having embodied thereon a program, which when executed by a computer causes the computer to execute an information processing method, the method comprising:
 control of displaying, in augmented reality in a preparation mode in which a real object is disposed, information that supports disposition of the real object on a basis of prerecorded information about the real object with which a virtual object has an interaction;
 control of recording disposition result information of the disposition of the real object in the preparation mode in a disposition result information database referred to in a normal mode in which the virtual object that has the interaction with the disposed real object is displayed; and
 in a case where it is confirmed from the disposition result information of the real object that the real object designated has not been disposed in an interaction point, performing designated alternative processing for display of the virtual object.

* * * * *